United States Patent [19]

Ozawa

[11] Patent Number: 4,754,308
[45] Date of Patent: Jun. 28, 1988

[54] PHOTOGRAPH PRINTING APPARATUS

[75] Inventor: Yoshio Ozawa, Kanagawa, Japan

[73] Assignee: Fuji Photo Film Co., Ltd., Kanagawa, Japan

[21] Appl. No.: 81,253

[22] Filed: Aug. 3, 1987

[30] Foreign Application Priority Data

Aug. 5, 1986 [JP] Japan .................................. 61-184010
Aug. 5, 1986 [JP] Japan .................................. 61-184011
Aug. 5, 1986 [JP] Japan .................................. 61-184012

[51] Int. Cl.$^4$ ............................................. G03B 27/58
[52] U.S. Cl. ...................................................... 355/74
[58] Field of Search ....................... 355/53, 54, 45, 74, 355/75, 90, 91, 125, 78, 104, 50; 354/121

[56] References Cited

U.S. PATENT DOCUMENTS

| | | | |
|---|---|---|---|
| 3,315,561 | 4/1967 | Boutigue | 355/45 X |
| 3,732,010 | 5/1973 | Harter et al. | 355/74 X |
| 3,737,227 | 6/1973 | Harter et al. | 355/74 |
| 4,234,251 | 11/1980 | Nishida et al. | 355/74 X |
| 4,320,965 | 3/1982 | Kimura et al. | 355/74 |
| 4,583,837 | 4/1986 | Shiga | 355/74 X |

FOREIGN PATENT DOCUMENTS 142334  7/1935  Australia .............................. 355/74

Primary Examiner—Richard A. Wintercorn
Attorney, Agent, or Firm—Sughrue, Mion, Zinn, Macpeak, and Seas

[57] ABSTRACT

A photograph printing apparatus for printing an image on photographic paper has: a table for carrying photographic paper during printing; and a pair of masking members disposed on opposite sides of the optical axis of printing light. The pair of masking members define the size of a printing area on the photographic paper and are moved toward and away from each other in the direction of feed of the photographic paper thereby cooperating with the table in defining a gap constituting a passage for the feed of the photographic paper. Accordingly, during feeding, the leading end of the photographic paper is positively guided in the gap in the direction of feed of the photographic paper.

20 Claims, 6 Drawing Sheets

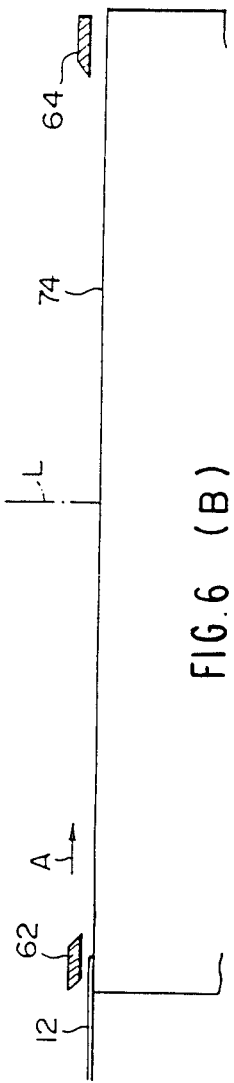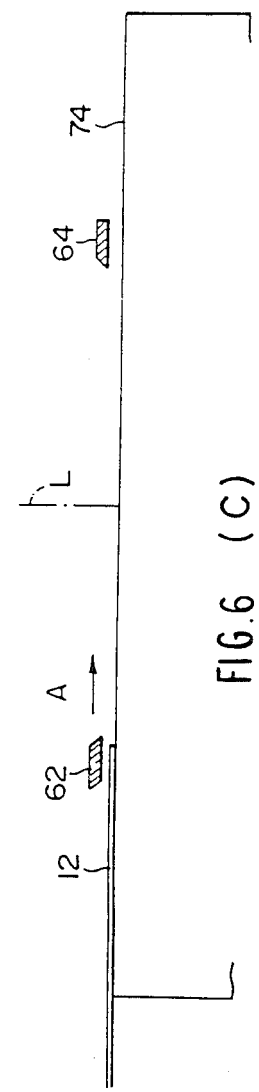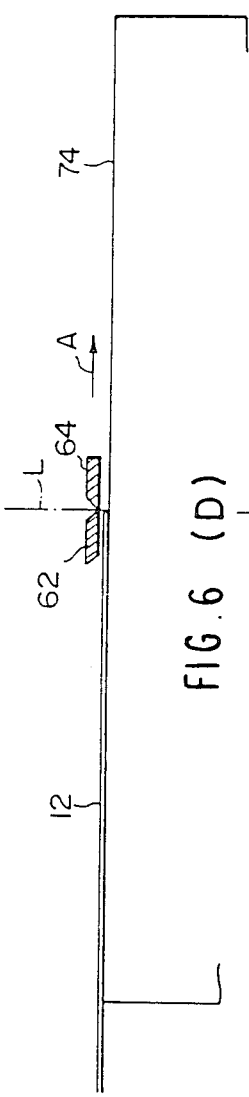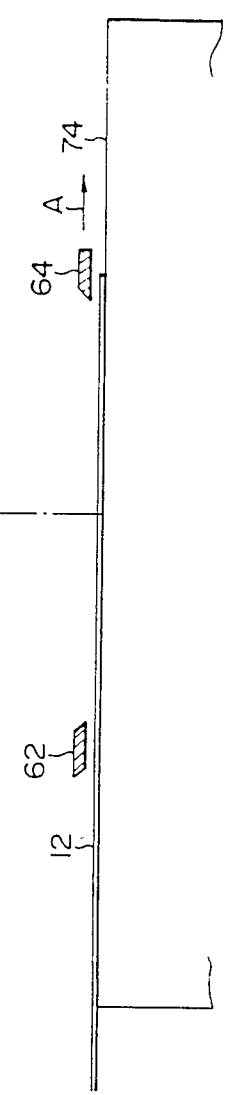

PHOTOGRAPH PRINTING APPARATUS

FIELD OF THE INVENTION

The present invention relates to a photograph printing apparatus arranged to print an image on photographic paper from a photographic film negative.

DESCRIPTION OF THE RELATED ART

In general, a typical photograph printing apparatus is arranged such that images on a photographic film negative are formed on photographic paper by means of printing light projected from a light source incorporated in the apparatus.

In this arrangement, it is common practice to employ a roll of photographic paper in such a photograph printing apparatus in order to print a multiplicity of images. The leading end of the rolled photographic paper is fed to an image forming or printing position at which an image is formed on the photosensitive surface of the photographic paper by effecting printing in a required sequence.

However, when the leading end of photographic paper is to be fed to the printing position, this leading end may interfere with mask members disposed at the printing position for defining a printing area on the photographic paper in which an image is printed. This could constitute one cause of the failure of feed. For this reason, a typical conventional type of arrangement is such that, during feeding of the leading end of photographic paper, this leading end is guided manually or by means of a special guide member (refer to Japanese Patent Publication No. 36410/1978). This arrangement forms the cause of an awkward printing operation, a complicated structure of guide means and many other drawbacks.

SUMMARY OF THE INVENTION

It is therefore an object of the present invention to provide a photograph printing apparatus having masking members for determining a printing area on photographic paper during printing, which masking members can also be used as guide means which assist in the feeding of the photographic paper and obviate the need for incorporation of any special guide means.

The aforementioned object is achieved by the present invention providing a photograph printing apparatus for printing an image on photographic paper, comprising:

a table for carrying the photographic paper during printing; and a pair of first masking means disposed on opposite sides of the optical axis of printing light projected onto the photographic paper and movable toward and away from each other in the direction of feed of the photographic paper such as to vary the distance therebetween thereby defining the length of a printing area on the photographic paper in the direction of feed of the photographic paper, the pair of first masking means cooperating with the printing table in defining a gap constituting a passage for the feed of the photographic paper in such a manner as to prevent the photographic paper from lifting during feeding thereof.

In accordance with the present, therefore, the pair of first masking means cooperate with the table in suitably supporting the leading end of the photographic paper during feeding thereof. For example, in a case where the leading end of the photographic paper is fed by virtue of its hardness per se with its intermediate portion being clamped, it is possible to positively guide the leading end. In this way, the pair of masking means also serve as means for guiding the leading end of the photographic paper.

Also, each of the first masking means is arranged such that the end thereof opposite to the optical axis of printing light is made of a flexible material, and is rolled about this end which is substantially located along the axis of a roll. This enables a photograph printing apparatus which has a large printing area and yet in which photographic paper can be positively fed without the need of increasing the overall size of the apparatus, i.e., in spite of its compact construction.

In one specific form of the present invention, a photograph printing apparatus further includes a pair of second masking means disposed on opposite sides of the optical axis of the printing light projected onto the photographic paper and movable toward and away from each other in the direction substantially normal to that of feed of the photographic paper such as to vary the distance therebetween thereby defining the length of a printing area on the photographic paper in the direction of the breadth of the photographic paper, the pair of second masking means cooperating with the table in preventing the lifting of the breadthwise sides of the photographic paper.

In accordance with such a specific form, therefore, the pair of second masking means cooperate with the table in guiding the breadthwise sides of the photographic paper, and this provides the further positive feeding of the photographic paper. The pair of second masking means can also be applied to the case where no image is to be printed along the periphery of a photographic sheet, that is, a print having a margin is to be obtained. In order to select a desired one between prints having a margin and no margin, the pair of second masking means have only to be moved a slight distance. The pair of first masking means, of course, is preferably constructed such that, when a print having a margin is needed, they can be moved a slight distance together with the second masking means.

The second masking means have channels facing the table for receiving therein the breadthwise sides of the photographic paper. This arrangement constitutes suitable guide means corresponding to the breadthwise sides of the photographic paper, thereby preventing the zigzag movement of the same.

BRIEF DESCRIPTION OF THE DRAWINGS

FIGS. 6(A) to 6(D) are diagrammatic side views showing the movement of the lengthwise masking head used in the presently preferred embodiment.

DESCRIPTION OF THE PREFERRED EMBODIMENT

Figure 1:
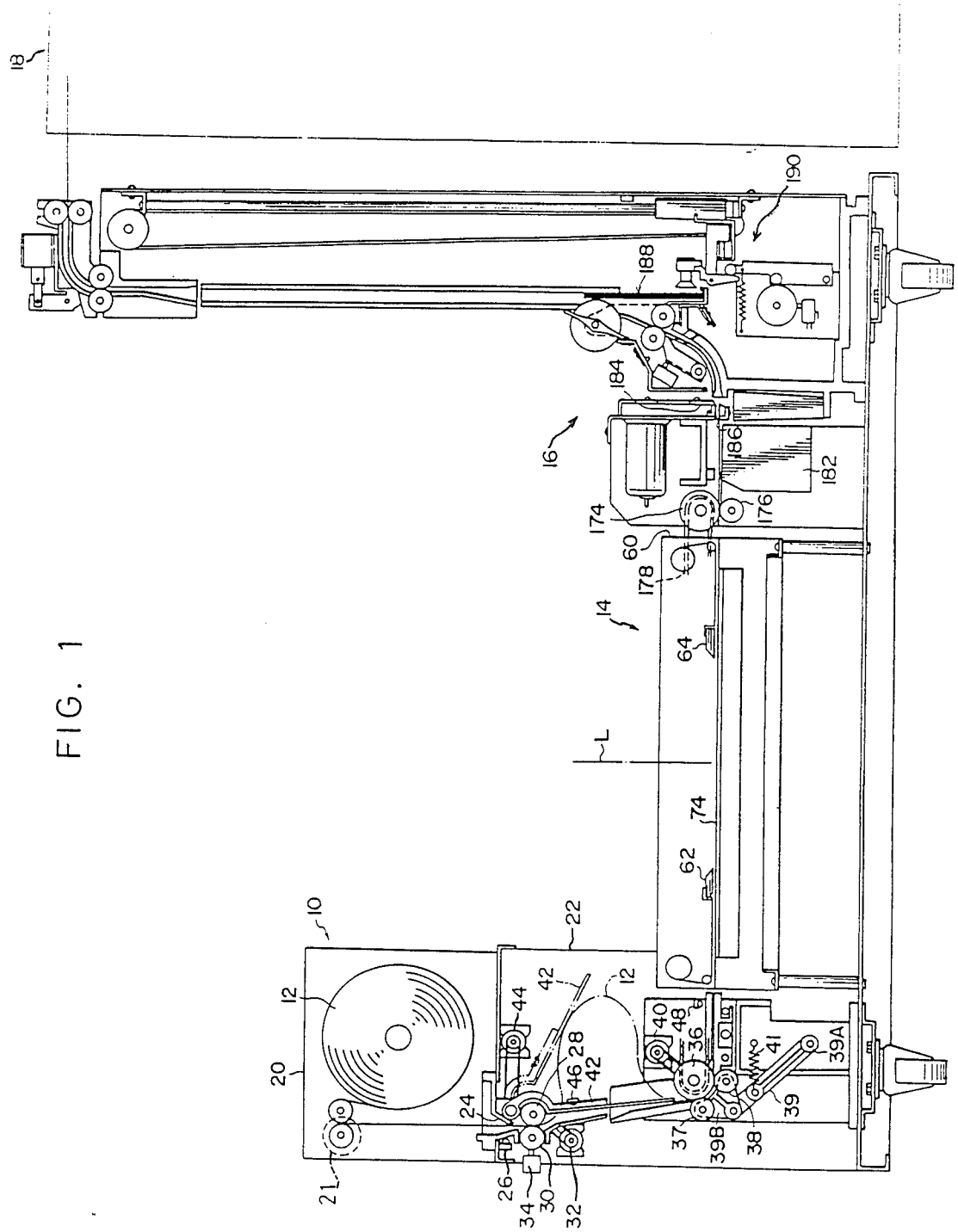
FIG. 1 is a diagrammatic, longitudinal sectional view of a preferred embodiment of a photograph printing apparatus in accordance with the present invention.

FIG. 1 shows the overall construction of a photographic-paper feeding system incorporated in a photograph printing apparatus to which the present invention is applied. The photographic-paper feeding system is essentially arranged such that the leading end of photographic paper 12 accommodated in a photographic-paper accommodating section 10 is fed to a photograph printing section 14, an image being formed thereon in the photograph printing section 14, and the exposed photographic paper having the formed image thereon being fed to a development section 18 via a pre-development working section 16.

(Photographic-Paper Accommodating Section)

The photographic-paper accommodating section 10 has a box 20 containing a roll of the photographic paper 12 which is not exposed, and is attached to a machine base 22. When a feed knob 21 attached to the box 20 is rotated in an engaged state, the leading end of the photographic paper 12 is passed through an outlet 24.

The machine base 22 has a pair of clamping feed rollers 28, 30 and a sensor 26 for detecting the leading end of the photographic paper 12 which is extracted through the outlet 24. The clamping feed roller 28 is caused to rotate about its axis under the drive of a motor 32. When the sensor 26 detects the leading end of the photographic paper 12, a solenoid 34 is driven to cause the clamping feed roller 30 to approach the clamping feed roller 28, with the result that the leading end of the photographic paper 12 is clamped between the rollers 28 and 30.

Clamping feed rollers 36, 37 and 38 are disposed downstream of the clamping feed rollers 28 and 30, the clamping feed rollers 36, 37 and 38 cooperating with one another in clamping therebetween the leading end of the photographic paper 12 supplied by the rotation of the clamping feed rollers 28 and then feeding the photographic paper 12 toward the photograph printing section 14. The clamping feed roller 36 is arranged to be rotated about its axis under the drive of a motor 40.

An arm 39 is rotatably supported at one end thereof on the machine base 22 via a shaft 39A for swinging movement about the shaft 39A and is connected to a bracket 39B at the other end. The clamping feed rollers 37 and 38 are supported by the bracket 39B connected to the latter end of the arm 39B for swinging movement with respect to the machine base 22. A tension coil spring 41 is disposed between the arm 39 and the machine base 22 for urging the clamping feed rollers 37 and 38 against the clamping roller 36.

A guide plate 42 is disposed between the clamping feed rollers 28, 30 and the clamping feed rollers 36, 37, the guide plate 42 being rotatable through a predetermined angle about its axis disposed near the clamping feed roller 28. As shown in FIG. 1, this guide plate 42 is capable of being rotated under the drive of the motor 44 such that the plate 42 may be moved between two different positions; at one position of them, the plate 42 is located in the vicinity of the passage for the feed of the photographic paper 12 whereas, at the other position, the plate 42 is set back from the aforesaid passage, as shown by an imaginary line of FIG. 1. The guide plate 42 is provided with a sensor 46 capable of detecting a loop shown by an imaginary curve, the loop being formed by an intermediate portion of the photographic paper 12 when the guide plate 42 reaches the latter position shown by the imaginary line in FIG. 1.

A sensor 48 is disposed in the vicinity of the inlet of the photograph printing section 14 and in face-to-face relationship with the passage for the feed of the photographic paper 12, thereby enabling detection of the leading end thereof.

(Photograph Printing Section)

The construction of the photograph printing section 14 will be described below with reference to FIGS. 2 to 5. The photograph printing section 14 is essentially arranged such that, when the photographic paper 12 is held in position within a frame 60, the printing area of the paper 12 is determined by the cooperative movement of lengthwise masking heads 62, 64 movable in the lengthwise direction of the paper 12 and breadthwise masking heads 66, 68 movable in the breadthwise direction of the same; and the thus-determined printing area is exposed to printing light projected by a light source (not shown).

The frame 60 has vertical flat side walls which constitute a rectangular shape in plan view with its top and bottom being fully opened, and on side of the side walls has an insertion opening 70 through which the photographic paper 12 is inserted while its opposite side has a discharge opening 72 through which the photographic paper 12 is discharged. A table 74 is disposed under the orbit formed by the photographic paper 12 which is passed from the insertion opening 70 to the discharge opening 72, and the table 74 provides a surface on which the photographic paper 12 is supported. This table 74 includes a multiplicity of perforations 76 which communicate with a suction means 78 such as a suction pump disposed in the interior of the table 74. Accordingly, when held in position on the table 74, the photographic paper 12 is drawn tightly against the table 74 under the draw of evacuating air through the perforations 76 so that the paper 12 may be made flat during printing.

Figure 3:
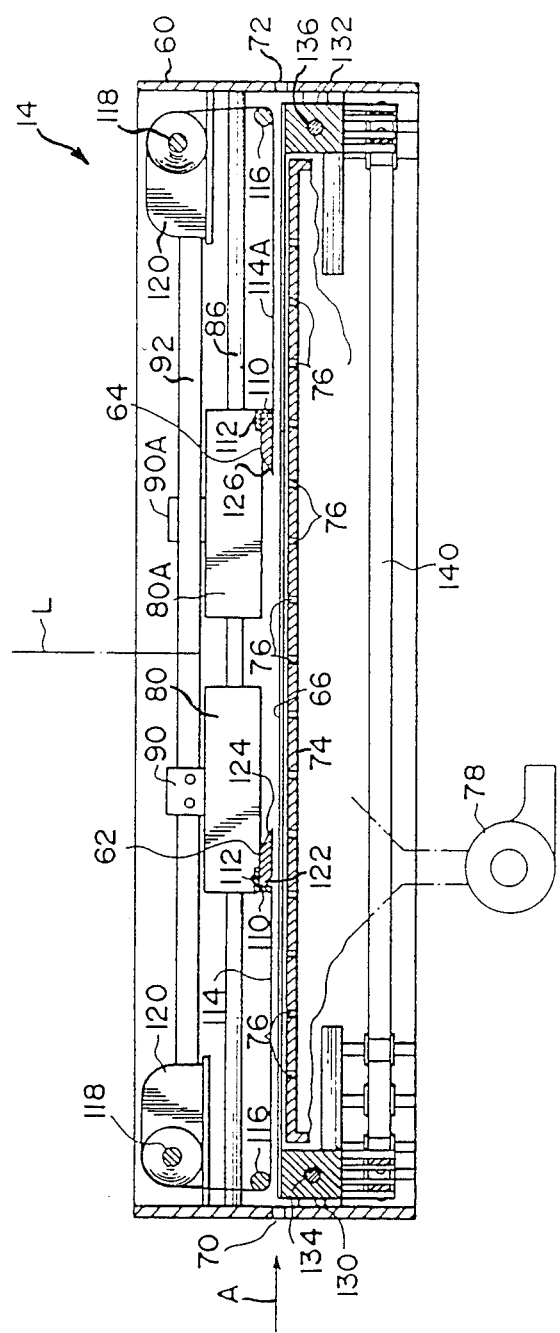
FIG. 3 is a sectional view taken along the line III—III of FIG. 2.
Figure 5:
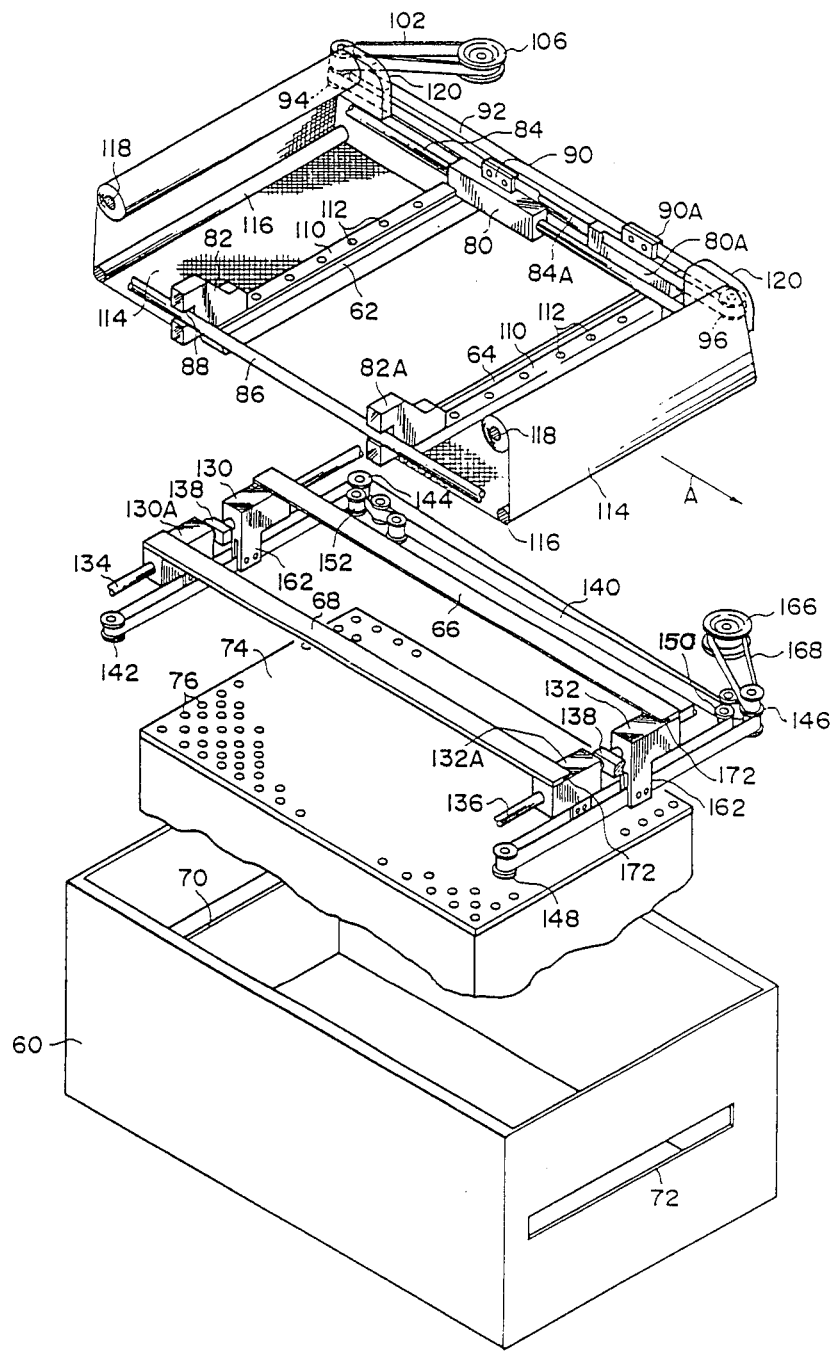
FIG. 5 is a diagrammatic perspective view showing in exploded form the essential components used in the photograph printing apparatus of the present invention.

As shown in FIGS. 3 and 5, each of the lengthwise masking heads 62 and 64 is made of a thin plate having a longitudinal axis extending normal to the direction in which the photographic paper 12 is fed (the direction indicated by an arrow A). The lengthwise masking head 62 is disposed on the upstream side of the passage with respect to the lengthwise masking head 64.

Movable blocks 80 and 82 are attached to the opposite ends of the lengthwise masking head 62. A guide rod 84 is supported by the frame 60 in parallel with the direction of feed of the photographic paper 12, the guide rod 84 passing through the movable block 80. The movable block 82 is carried via a bifurcated portion 88 on a guide rod 86 which extends in parallel with the guide rod 84. Accordingly, the respective movable blocks 80 and 82 are arranged for sliding movement along the guide rods 84 and 86 so as to cause straight movement of the lengthwise masking head 62 upstream and downstream in the direction of feed of the photographic paper 12.

Movable blocks 80A and 82A are likewise attached to the opposite ends of the lengthwise masking head 64, and are respectively carried by guide rods 84A and 86. The guide rod 84A is supported by the frame 60 in such a manner as to extend in the vicinity of and in parallel with the guide rod 84. As shown in FIG. 3, the respective lengthwise masking heads 62 and 64 are attached to edges of the undersides of the movable blocks 80 and 80A. The movable blocks 80 and 80A are moved back and forth in the directions opposite to each other along different orbits so that the lengthwise masking heads 62 and 64 are capable of being moved toward each other until the facing edges of the lengthwise masking heads 62 and 64 are brought into contact with each other on an optical axis L.

Figure 2:
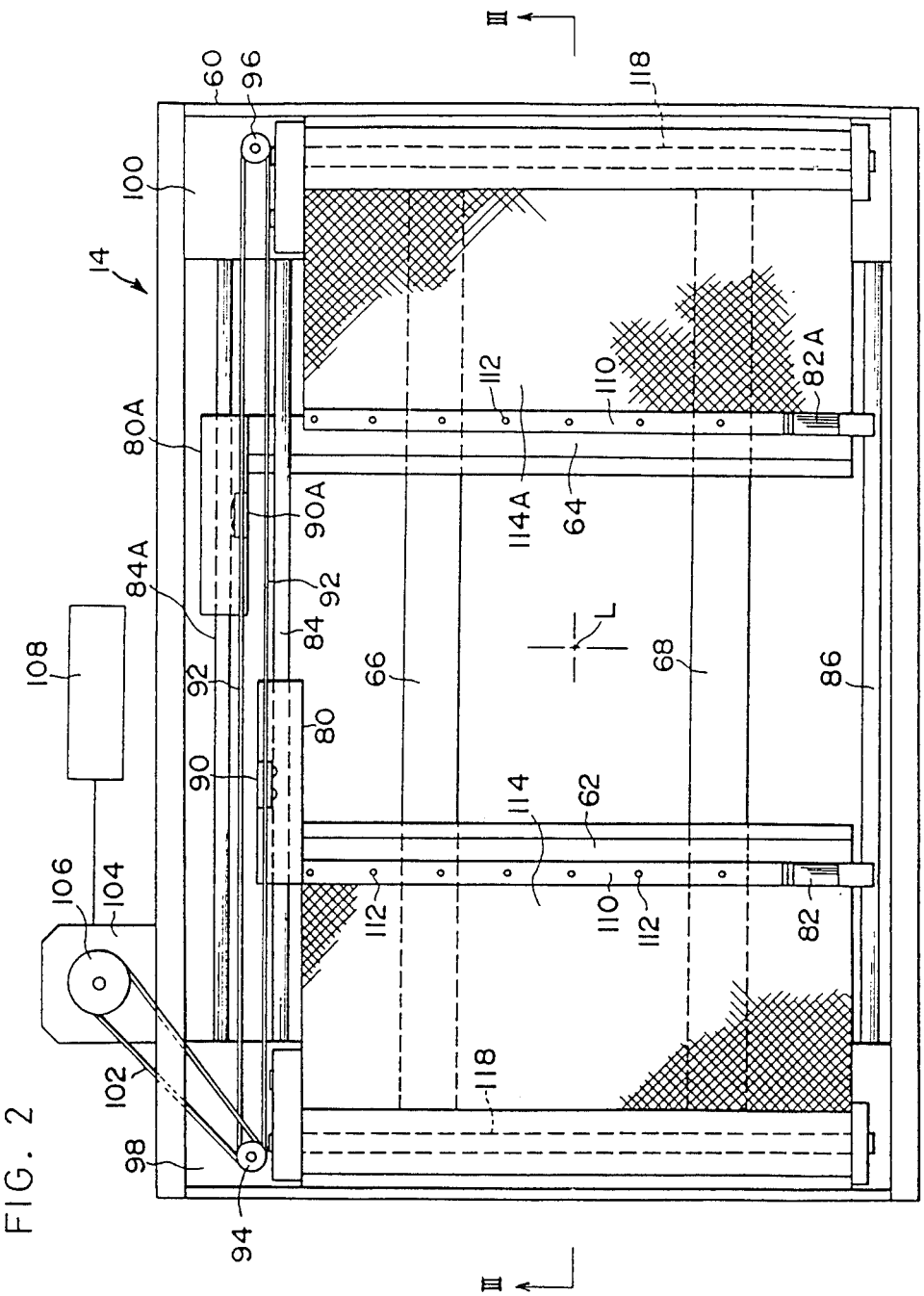
FIG. 2 is a diagrammatic plan view of lengthwise masking heads and associated components incorporated in the apparatus of the present invention.

As shown in FIGS. 2, 3 and 5, the movable blocks 80 and 80A are respectively engaged with intermediate portions of an endless belt 92 via brackets 90 and 90A. The endless belt 92 serves as a timing belt which is looped around pulleys 94 and 96 at intermediate portions thereof. The respective pulleys 94 and 96 are supported by brackets 98 and 100 for rotation about their axes. The bracket 98 is secured to the the frame 60 on the upstream side thereof as viewed in the direction of feed of the photographic paper 12 while the bracket 100 is secured to the frame 60 on the downstream side thereof in the same direction. Thus, the endless belt 92 forms a pair of linear portions which extend in parallel with each other between the pulleys 94 and 96. The movable block 80 is attached to one of these linear parallel portions while the movable block 80A is attached to the other of them. Accordingly, when the endless belt 92 is rotated, the movable blocks 80 and 80A are capable of being moved in the directions opposite to each other, that is, in the direction in which the movable blocks 80 and 80A are moved toward and away from each other with respect to the optical axis L.

An endless belt 102 is passed around the pulley 94 and in side-by-side relation to the endless belt 92 along the axis of the pulley 94. The endless belt 102 is passed around an pulley 106 connected to the output shaft of a motor 104 such that the torque of the motor 104 is transmitted to the endless belt 92. The motion of the motor 104 is controlled by a control means 108 employing a microcomputer as the main component.

As shown in FIGS. 3 and 5, an L-shaped metal member 110 is secured via machine screws 112 on the side of each of the lengthwise masking heads 62 and 64 opposite to the optical axis L. One lengthwise end of a masking body 114 is clamped between one of the L-shaped metal members 110 and the lengthwise masking head 62 while one lengthwise end of a masking body 114A is clamped between the other of the L-shaped metal members 110 and the lengthwise masking head 64, the masking bodies 114 and 114A being made of a flexible material such as cloth. Rods 116 are supported by the frame 60 on the upstream and downstream sides in the direction of feed of the photographic paper 12 and each of the rods 116 has a longitudinal axis disposed normal to the same direction. When passing around the corresponding rods 116, the masking bodies 114 and 114A changes their respective directions of travel, and are drawn upwardly at substantially right angles with respect to the same directions. The respective masking bodies 114 and 114A are wrapped around corresponding take-up shafts 118 which are supported by the frame 60 above and in parallel with the bars 116. The take-up shafts 118 are consistently urged by take-up urging means 120 such as a flat spiral spring in the direction in which the masking bodies may be wrapped around the shaft 118. Accordingly, a predetermined level of tension constantly acts on each of the masking bodies 114 and 114A.

The respective portions of the lengthwise masking bodies 114 and 114A defined between the bars 116 and the lengthwise masking heads 62, 64 are maintained in parallel with the surface of the table 74 on which the photographic paper 12 is held in position, thereby forming a slight gap therebetween. When the lengthwise masking heads 62 and 64 are engaged with each other on the optical axis L, the table 74, the lengthwise masking heads 62, 64 and the masking bodies 114, 114A cooperate with one another in defining a guide space which assists in the feeding of the photographic paper 12. While the photographic paper 12 is being fed in the direction of the arrow A, the leading end thereof can be suitably guided.

The lengthwise masking head 62 and the associated L-shaped metal member 110 constitutes in combination a channel 122 which extends in the direction normal to that indicated by the arrow A, thereby preventing the leading end of the photographic paper 12 from coming into contact with a corner or edge of the lengthwise masking head 62 while the paper 12 is being fed in the direction of the arrow A. The respective lengthwise masking heads 62 and 64 have chamfers 124 and 126 on the upper sides of their opposed sides such that a recess or space having a lateral flat cross-sectional shape may be formed in face-to-face relationship with the light source (the top of FIG. 3). The lengthwise masking heads 62, 64 and the masking bodies 114, 114A are arranged to constitute a pair of first masking means.

Figure 4:
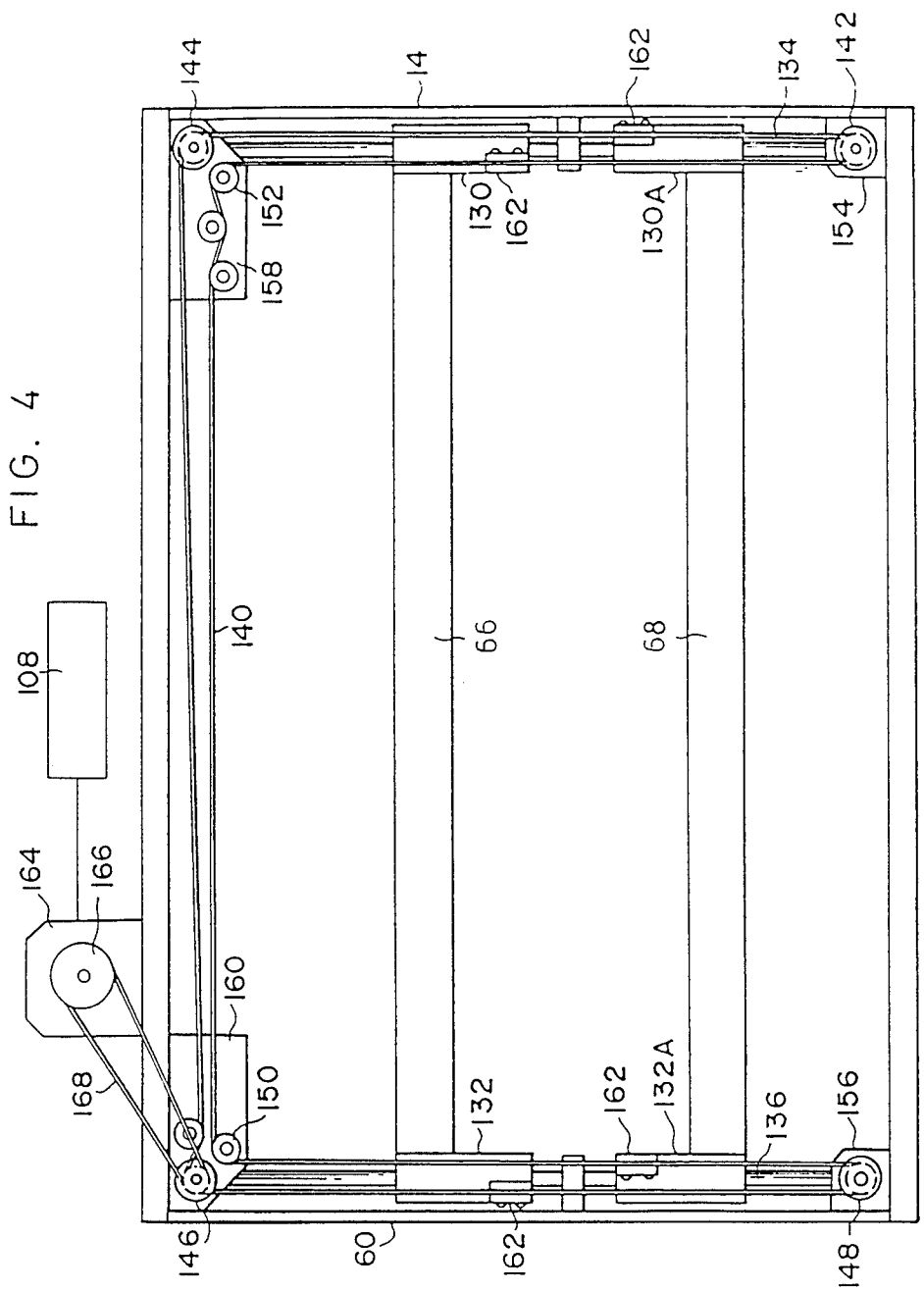
FIG. 4 is a diagrammatic bottom view of breadthwise masking heads and associated components incorporated in the apparatus of the present invention.

As shown in FIGS. 4 and 5, the breadthwise masking head 66 is connected at its opposite ends to movable blocks 130 and 132. Guide rods 134 and 136 respectively extend through the movable blocks 130 and 134 in the directions of their longitudinal axes. The guide rods 134 and 136 are disposed in the direction normal to that in which the photographic paper 12 is fed and are supported by upstream and downstream portions of the frame 60 as viewed in the direction of feed of the paper 12. This arrangement allows the breadthwise masking head 66 to be moved in the breadthwise direction of the photographic paper 12, that is, in the direction normal to that in which the photographic paper 12 is fed.

The breadthwise masking head 68 is likewise connected at its opposite ends to movable blocks 130A and 132A. The respective guide rods 134 and 136 extend through the movable blocks 130A and 132A in the directions of their longitudinal axes such that the breadthwise masking head 80 may be moved along the guide rods 134 and 136. This arrangement allows the breadthwise masking heads 66 and 68 to be moved toward and away from each other with respect to the optical axis L. Incidentally, the guide rods 134 and 136 are supported at their respective intermediate portions by the frame 60 via arms 138 which serve as reinforcing members.

As shown in FIG. 4, the movable blocks 130, 132, 130A and 132A are attached to intermediate portions of an endless belt 140. The endless belt 140 is passed over pulleys 142, 144, 146, 148, 150 and 152 so as to change the direction in which the endless belt 140 travels. The respective pulleys 142 and 148 are disposed below the guide rollers 134 and 136, and are arranged on one side of the frame 60 along the direction in which the photographic paper 12 is fed. The respective pulleys 142 and 148 are rotatably supported via brackets 154 and 156 on the frame 60. Also, the pulleys 144, 152 and 146, 150 are respectively disposed below the guide rods 134 and 136, and are arranged on the other side of the frame 60 along the aforesaid direction. The pulleys 144, 152 and 146, 150, respectively, are rotatably supported via brackets 158 and 160 on the frame 60.

Accordingly, the endless belt 140 as a whole has a double-C-shaped configuration in plan view, and more specifically has a C-shaped inner orbit which is defined by the pulleys 142, 152, 150 and 148 and a C-shaped outer orbit which is defined by the pulleys 142, 144, 146 and 148. These C-shaped orbits respectively have two leg portions; one is defined between the pulley 142 and the pulleys 144, 152 while the other is defined between the pulley 148 and the pulleys 146, 150. Also, the aforesaid inner and outer orbits of the double-C-shaped configuration extend in parallel with each other along the two leg portions. The movable block 132 is attached via a bracket 162 to the outer orbit of the leg portion of the C-shaped configuration which is defined between the pulleys 146 and 148 while the movable block 130 is attached via another bracket 162 to the inner orbit of the leg portion which is defined between the pulleys 142 and 152. The movable block 132A is attached to the inner orbit of the leg portion of the C-shaped configuration which is defined between the pulleys 148 and 150 while the movable block 130A is attached to the outer orbit of the leg portion which is defined between the pulleys 142 and 144.

Accordingly, when the endless belt 140 is moved in either direction, that is, the two leg portions are moved back and forth in either of the directions normal to that in which the photographic paper 12 is fed, the breadthwise masking heads 66 and 68 are moved toward and away from each other and in parallel with each other with respect to the optical axis L so that it is possible to adjust the distance between the breadthwise masking heads 66 and 68.

An endless belt 168 is looped around the pulley 146 and a pulley 166 attached to the output shaft of a motor 164 so as to drive the endless belt 140. The rotary motion of the endless belt 168 is controlled by the aforesaid control means 108.

Each of the breadth masking heads 66 and 68 constituting a second masking means has an L-like cross sectional shape across its length, and, as shown in FIG. 5 by way of example, substantially U-shaped channels 172 are formed between the opposed ends of the breadthwise masking heads 66 and the corresponding surfaces of the movable blocks 130, 132 as well as between the opposed ends of the breadwise masking heads 68 and the corresponding surfaces of the movable blocks 130A, 132A. The tops of the movable blocks 130, 132, 130A and 132A are flush with the upper surface of the table 74 on which the photographic paper 12 is held in position. When the leading end of the photographic paper 12 is fed in the direction indicated by the arrow A, the breadthwise sides of the paper 12 are inserted into the channels 172, and this prevents the photographic paper 12 from lifting along its breadthwise sides.

As shown in FIG. 1, clamping feed rollers 174 and 176 are disposed on the downstream side of the frame 60, and an endless belt 178 is looped around the clamping feed rollers 174 and 36 such that rotational drive is imparted to the former roller 174 in synchronism with the latter roller 36.

(Pre-development Working Section 16)

This pre-development working section 16 is essentially constituted by: a printer 182 arranged to print characters on the back of the photographic paper 12 which is supplied from the photograph printing section 14 after completion of the printing step; and a cutter 184 arranged to cut the photographic paper 12 into sheets each having a formed image. A sensor 186 is disposed upstream of the cutter 184 so as to detect the leading end of the photographic paper 12.

Each sheet which is cut from the exposed photographic paper 12 is stored in a storage section 188. A sheet feed means 190 is disposed adjacent to the storage section 188 for feeding each of the cut sheets to the development section 18 after completion of adjustment of the rate at which the cut sheets are processed at both the photograph printing section 14 and the development section 18.

The operation of the embodiment will be described below.

Before a printing operation is started, the box 20 including a roll of the photographic paper 12 is loaded onto the machine base 22. The leading end of the photographic paper 12 drawn out of the box 20 is inserted into the gap formed between the clamping feed rollers 28 and 30 which are spaced apart.

When a print start button (not shown) is operated, the solenoid 34 is activated to bring the clamping feed roller 30 in contact with the clamping feed roller 28, thereby clamping the leading end therebetween. The thus-clamped leading end of the photographic paper 12 is fed under the drive of the motor 32. The leading end is in turn clamped between the clamping feed rollers 36 and 37, 38, and then fed in the direction indicated by the arrow A under the drive of the motor 40.

During this time, the lengthwise masking heads 62 and 64 are spaced apart from each other to the full extent as shown in FIG. 6(A). When the photographic paper 12 is moved by the torque of the motor 104, the lengthwise masking heads 62 and 64 are moved toward each other in synchronism with the speed of travel of the leading end of the photographic paper 12.

Accordingly, as shown in FIG. 6(B), while the leading end of the photographic paper 12 is being moved toward the optical axis L, such leading end is consistently supported between the lengthwise masking head 66 and the table 74. This prevents the leading end from lifting before reaching the optical axis L.

It is preferred that the motor 164 is driven in accordance with the width of the photographic paper 12 which is to be fed, thereby presetting the positional relationship between the breadthwise masking heads 66 and 68 so as to allow the breadthwise sides of the photographic paper 12 to engage with the channels 172. This presetting enables smooth guidance of the breadthwise sides of the photographic paper 12 and therefore prevents the zigzag movement of the paper 12.

When the leading end of the photographic paper 12 reaches the optical axis L of the printing light, the lengthwise masking heads 62 and 64 are brought into light-tight contact with each other as shown in FIG. 6(C). Since the photographic paper 12 is further fed in the direction of the arrow A, the lengthwise masking heads 62 and 64 are moved away from each other as shown in FIG. 6(D) in synchronism with the movement of the photographic paper 12. Accordingly, the leading end is supported between the lengthwise masking head 64 and the printing table 74, thereby preventing the photographic paper 12 from lifting.

When the lengthwise masking heads 62 and 64 are spaced apart to the full extent, the leading end of the photographic paper 12 passes by the bottom of the lengthwise masking head 64 and then through the discharge opening 72. In consequence, the leading end is clamped between the clamping feed rollers 174 and 176.

In this state, when the leading end is further fed in the direction of the arrow A and approaches the sensor 186 (FIG. 1), the motion of the motors 32 and 40 is temporarily stopped. In this state, when the motors 32 and 40 are activated by a predetermined number of rotation, the leading end reaches the position of the cutter 184. After the photographic paper 12 has been fed by a predetermined length, the paper 12 is cut by the cutter 184.

At this time, the motor 40 is reversed to move the thus-cut sheet backwardly until the leading end of the sheet reaches the position of the sensor 48.

In this state, when the motor 44 is activated, the guide plate 42 is lifted to the upper position shown by the imaginary line in FIG. 1, thereby allowing an intermediate portion of the cut sheet to form the loop shown by the imaginary curve in FIG. 1. This absorbs the backward stroke of the leading end of the cut sheet.

In this state, printing is enabled. When the motor 40 is activated in accordance with the previously entered size of an image to be printed on the sheet cut from the photographic paper 12, and the leading end of the cut sheet is fed toward the photograph printing section 14. In the same manner as described previously, the lengthwise masking heads 62, 64 and the breadthwise masking heads 66, 68 are respectively moved toward and away from each other in synchronism with the feeding of the cut sheet, and therefore the lengthwise sides of the cut sheet is guided by the lengthwise masking heads 62 and 64 while the breadthwise sides of the same are guided by the breadthwise masking heads 66 and 68. Thus, the cut sheet is smoothly guided and held in position on the table 74.

When the leading end of the cut sheet passes the optical axis L and travels therefrom by a distance equivalent to half of the size of an image to be printed, the motors 40 and 104 are stopped.

Subsequently, an image is printed on the cut sheet from a photographic negative (not shown) by means of printing light projected from the light source (not shown).

In general, when an image is printed on a photographic sheet, two kinds of print can be obtained; one is a print with a margin while the other is a print without any margin. The former print has a margin having no printed image whereas the latter print has an image which is printed all over the photosensitive surface thereof. In order to select a desired one between the two printed states, the lengthwise masking heads 62, 64 and the breadthwise masking heads 66, 68 may respectively be moved by finely driving the motor 104.

More specifically, if a print having a margin is needed, the lengthwise masking heads 62 and 64 may be moved to such a slight extent that they partially cover the printing area of the cut sheet and at the same time the breadthwise sides of the cut sheet may be inserted into the channels 172 formed by the breadthwise masking heads 66 and 68. If no printed image is to be surrounded by a margin, that is, if an image is to be formed all over the photosensitive surface of a cut sheet, the motors 104 and 164 are driven by a further slight extent, thereby causing the lengthwise masking heads 62, 64 and the breadthwise masking heads 66, 68 to be respectively spaced apart at slight intervals, normally, by an amount equivalent to the width of each margin.

In a case where the cut sheet is to be again fed after completion of printing, the motors 104 and 164 are activated to cause the lengthwise masking heads 62 and 64 to move away from each other in synchronism with the travel of the exposed cut sheet and at same time to cause the breadthwise masking heads 66 and 68 to assume a state in which the breadthwise sides of the cut sheet are allowed to engage with the channels 172. In consequence, as in the case where the photographic paper 12 is introduced into the photograph printing section 14, the cut sheet is smoothly guided toward the pre-development working section 16.

The thus-fed sheet is cut by the cutter 184 provided in the pre-development working section 16, and then stored in the storage section 188. Subsequently, each stored sheet is supplied by the sheet feed means 190 to the development section 18, in which the sheets are subjected to development.

Although the motor 32 is incorporated in order to feed photographic paper in the above-described embodiment, the motor 32 may be omitted. In a case where it is omitted, the leading end of the photographic paper 12 drawn out of the box 20 may be manually inserted into the gap between the clamping feed rollers 36 and 37.

Although the foregoing description of the preferred embodiment illustratively refers to an apparatus in which printing is effected by means of the light source disposed above the table 74, the arrangement of the present apparatus may be constructed such that the upper side becomes the lower. More specifically, the present invention is applicable to an arrangement in which the table is disposed above the passage for the feed of photographic paper, printing being effected by projecting printing light onto the photographic paper from below.

The above-described embodiment has an illustrative arrangement in which the lengthwise masking heads 62 and 64 are moved the same distance in the opposite directions at the same time. However, it is also possible to arrange the masking heads 62 and 64 such that each of them may be caused to travel a different distance at the same time.

In the above-described embodiment, the respective lower surfaces of the masking bodies 114 and 114A are partially flush with the corresponding sides of the lengthwise masking heads 62 and 64, thereby preventing the photographic paper 12 from lifting about its intermediate portion. However, even if there is a large clearance between the table 74 and the masking bodies 114, 114A, since the leading end of the photographic paper 12 is properly guided, the present invention can be applied without any problem.

As shown specifically in FIGS. 6(A) to 6(D), the presently preferred embodiment is arranged such that the lengthwise masking heads 62 and 64 are moved in synchronism with the feeding of the photographic paper 12. However, prior to the feeding of the photographic paper 12, the lengthwise masking heads 62 and 64 may be in advance brought into light-tight contact with each other on the optical axis L, and, during a printing operation, the mask 62 and 64 may be moved away from each other by a predetermined distance under the drive of the motor 104.

Also, the masking bodies 114 and 114A may be made of any kind of flexible material instead of cloth which is used by way of example in the above-described embodiment.

Moreover, in the above-described embodiment, in order to drive the respective masking heads, the torque of the associated motors is transmitted thereto via the endless belts. However, the present invention may employ any type of flexible means capable of transmitting such torque instead of the endless belts.

In addition, in the present invention, not only the breadthwise masking heads but also the lengthwise masking heads may be driven by a C-shaped endless belt.

What is claimed is:

1. A photograph printing apparatus arranged to print an image on photographic paper, comprising:
   a table for carrying said photographic paper during printing; and
   a pair of first masking means disposed on opposite sides of the optical axis of printing light projected onto said photographic paper and movable toward and away from each other in the direction of feed of said photographic paper such as to vary the distance therebetween thereby defining the length of a printing area on said photographic paper in the direction of feed of said photographic paper, said pair of first masking means cooperating with said printing table in defining a gap constituting a passage for the feed of said photographic paper in such a manner as to prevent said photographic paper from lifting during feeding thereof.

2. A photograph printing apparatus according to claim 1, wherein each said first masking means includes a flexible masking body, said masking body being rolled such that its end remote from said optical axis of said printing light is located along the axis of a roll.

3. A photograph printing apparatus according to claim 2, wherein each said first masking means includes a masking head member attached to each of the ends of said masking bodies adjacent to said optical axis of said printing light and parallel with each other, said masking head members cooperating with each other in guiding said masking bodies while said pair of first masking means are being moved toward and away from each other.

4. A photograph printing apparatus according to claim 1 further including a pair of second masking means disposed on opposite sides of said optical axis of said printing light projected onto said photographic paper and movable toward and away from each other in the direction substantially normal to that of feed of said photographic paper such as to vary the distance therebetween thereby defining the length of a printing area on said photographic paper in the direction of the breadth of said photographic paper, said pair of second masking means cooperating with said table in preventing the lifting of the breadthwise sides of said photographic paper.

5. A photograph printing apparatus according to claim 4, wherein each said second masking means includes a flexible masking body, said masking body being rolled such that its end remote from said optical axis of said printing light is located along the axis of a roll.

6. A photograph printing apparatus according to claim 5, wherein each said second masking means includes said masking head member attached to each of the ends of said masking bodies adjacent to said optical axis of said printing light and parallel with each other, said masking head members cooperating with each other in guiding said masking bodies while said pair of first masking means are being moved toward and away from each other.

7. A photograph printing apparatus according to claim 6, wherein each of said second masking means has a channel facing said table, said channels arranged to receive said breadthwise sides of said photographic paper.

8. A photograph printing apparatus according to claim 1 further including first drive means for causing the upstream one of said first masking means with respect to the direction of feed of said photographic paper to move toward said optical axis of said printing light in synchronism with the feeding speed of said photographic paper while the leading end of said photographic paper is approaching said optical axis during feed of said photographic paper and for causing the downstream one of said first masking means with respect to the direction of feed of said photographic paper to move away from said optical axis in synchronism with the feeding speed of said photographic paper while the leading end of said photographic paper is moving away from said optical axis 9. A photograph printing apparatus according to claim 8, wherein said first drive means is arranged to cause said upstream and downstream ones constituting said first masking means to travel the same distance in the directions opposite to each other and at the same time.

10. A photograph printing apparatus according to claim 1 further including:
    an endless member having an inner orbit and an outer orbit which are arranged around said optical axis of said printing light in a double-C-shaped form in plan view, said inner orbit and said outer orbit being coupled with each other at their opposite ends;
    a first connecting means for connecting either of said pair of first masking means to a portion of said outer orbit defined along a leg portion of said double-C-shaped form of said endless member;
    a second connecting means for connecting the other of said pair of first masking means to a portion of said inner orbit defined along said leg portion of said double-C-shaped form of said endless member; and
    drive means for driving said endless member to cause said pair of first masking means to move toward and away from each other.

11. A photograph printing apparatus according to claim 4, further including:
    an endless member having an inner orbit and an outer orbit which are arranged around said optical axis of said printing light in a double-C-shaped form in plan view, said inner orbit and said outer orbit being connected to each other at their opposite ends;
    a first connecting means for connecting either of said pair of second masking means to a portion of said outer orbit defined along a leg portion of said double-C-shaped form of said endless member;
    a second connecting means for connecting the other of said pair of second masking means to a portion of said inner orbit defined along said leg portion of said double-C-shaped form of said endless member; and
    drive means for driving said endless member to cause said pair of second masking means to move toward and away from each other.

12. A photograph printing apparatus according to claim 11, wherein said leg portions of said double-C-shaped form are arranged substantially perpendicular to the direction of feed of said photographic paper.

13. A photograph printing apparatus for printing an image from a photographic negative on photographic paper which is fed along its feeding passage, comprising:
- a table for carrying said photographic paper during printing;
- a pair of first masking means disposed on the upstream and downstream sides of the optical axis of printing light projected onto said photographic paper, said pair of first masking means being moved toward and away from each other in the direction of feed of said photographic paper so that, during feeding, said pair of first masking means cooperate with said table in defining a gap constituting a passage for the feed of said photographic paper while, during printing, said pair of first masking means cooperate with said table in defining the length of a printing area on said photographic paper in the direction of feed of said photographic paper; and
- a pair of second masking means disposed on opposite sides of said optical axis of printing light projected onto said photographic paper, said pair of second masking means being moved toward and away from each other in the direction substantially normal to that of feed of said photographic paper thereby defining the breadthwise length of said printing area on said photographic paper.

14. A photograph printing apparatus according to claim 13, wherein each said first masking means includes a flexible masking body, said masking body being rolled such that its end remote from said optical axis of said printing light is located along the axis of a roll.

15. A photograph printing apparatus according to claim 13, wherein each said first masking means includes said masking head member attached to each of the ends of said masking bodies adjacent to said optical axis of said printing light and parallel with each other, said masking head members cooperating with each other in guiding said masking bodies while said pair of first masking means are being moved toward and away from each other.

16. A photograph printing apparatus according to claim 15, wherein each said second masking means has a channel facing said table, said channels arranged to receive said breadthwise sides of said photographic paper.

17. A photograph printing apparatus according to claim 13 further including first drive means for causing the upstream one of said first masking means with respect to the direction of feed of said photographic paper to move toward said optical axis of said printing light in synchronism with the feeding speed of said photographic paper while the leading end of said photographic paper is approaching said optical axis during feeding and for causing the downstream one of said first masking means with respect to the direction of feed of said photographic paper to move away from said optical axis of said printing light while the leading end of said photographic paper is moving away from said optical axis.

18. A photograph printing apparatus according to claim 17, wherein said first driving means is arranged to cause said first masking means to travel the same distance in the directions opposite to each other and at the same time.

19. A photograph printing apparatus according to claim 13, further including:
- an endless belt having an inner orbit and an outer orbit which are arranged around said optical axis of said printing light in a double-C-shaped form in plan view, said inner orbit and said outer orbit being coupled with each other at their opposite ends;
- a first connecting means for connecting either of said pair of first masking means to a portion of said outer orbit defined along a leg portion of said double-C-shaped form of said endless belt;
- a second connecting means for connecting the other of said pair of second masking means to a portion of said inner orbit defined along said leg portion of said double-C-shaped form of said endless belt; and
- drive means for driving said endless belt to cause said pair of second masking means to move toward and away from each other.

20. A photograph printing apparatus according to claim 19, wherein said leg portions of said double-C-shaped form are arranged substantially perpendicular to the direction of feed of said photographic paper.

* * * * *